(12) United States Patent
Yan et al.

(10) Patent No.: US 7,704,637 B2
(45) Date of Patent: Apr. 27, 2010

(54) LITHIUM ION BATTERY

(76) Inventors: Jianzhong Yan, No. 18, Fuquan Road, Changping District (CN) 102200; Yongzhi Mao, No. 18, Fuquan Road, Changping District (CN) 102200; Ping An, No. 18, Fuquan Road, Changping District (CN) 102200; Hui Chen, No. 18, Fuquan Road, Changping District (CN) 102200; Lu Qi, No. 18, Fuquan Road, Changping District (CN) 102200

( * ) Notice: Subject to any disclaimer, the term of this patent is extended or adjusted under 35 U.S.C. 154(b) by 0 days.

(21) Appl. No.: 12/297,494

(22) PCT Filed: Apr. 17, 2006

(86) PCT No.: PCT/CN2006/000703
§ 371 (c)(1),
(2), (4) Date: Oct. 17, 2008

(87) PCT Pub. No.: WO2007/118358
PCT Pub. Date: Oct. 25, 2007

(65) Prior Publication Data
US 2009/0123833 A1    May 14, 2009

(51) Int. Cl.
*H01M 2/00* (2006.01)
(52) U.S. Cl. .............. 429/163; 429/231.95; 429/209
(58) Field of Classification Search ........... 429/163, 429/231.95, 209
See application file for complete search history.

(56) References Cited

U.S. PATENT DOCUMENTS

| 6,027,836 | A  | * | 2/2000 | Okada et al. ........... 429/306 |
| 6,566,013 | B2 | * | 5/2003 | Nakamizo et al. ...... 429/129 |
| 2001/0004504 | A1 | * | 6/2001 | Nakamizo et al. ...... 429/246 |

* cited by examiner

*Primary Examiner*—Laura S Weiner

(57) ABSTRACT

A lithium ion battery characterized in that a porous elastomer made of non-metal material is provided among the positive and negative electrodes groups, or between the electrodes groups and the inner wall of the shell and the elastomer is in the shape of sheet or stick. The thickness of the elastomer is 0.5 mm-5.0 mm, and the porosity is 10%-80%. The said battery can avoid effectively the expansion of the shell during the cycle of charge and discharge, and can be processed conveniently, and the cyclic life and safety property of the battery can be improved effectively.

4 Claims, 1 Drawing Sheet

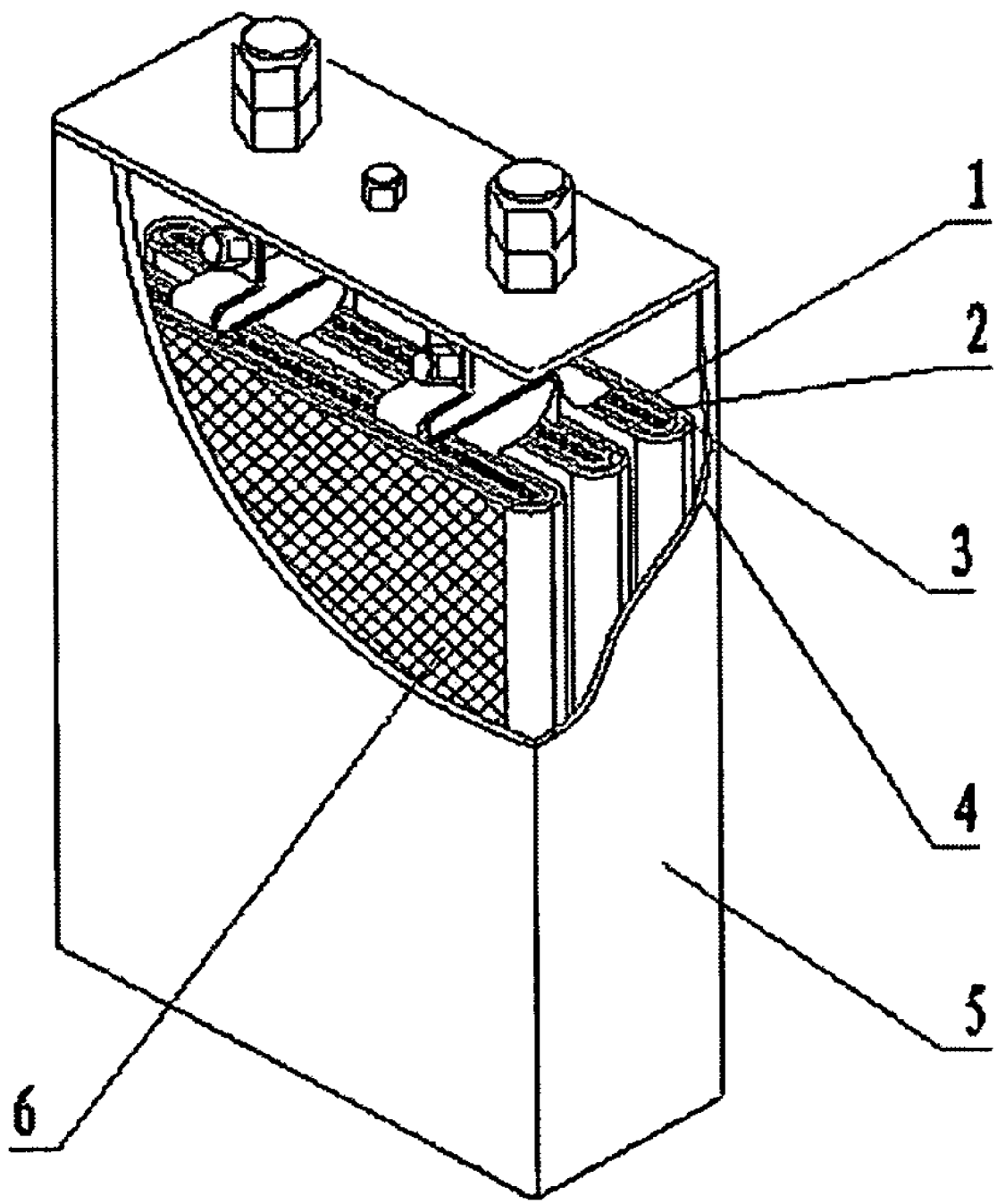

LITHIUM ION BATTERY

FIELD OF THE INVENTION

The invention relates to a battery, especially a lithium ion battery.

BACKGROUND OF THE INVENTION

At present changes of crystal lattice both appear in the anode and cathode of lithium ion battery during charge and discharge process, and the amounts of these changes are inequality, i.e. when in charge, $Li^+$ embeds off from the anode and enters into the electrolyte, then embeds into the cathode, while in discharge, it is reverse. The reaction mechanism acquires that the transferring path of Li+ should not be too long, so the thickness of the diaphragm must be controlled seriously in certain range (about 30 μm). Comparing to the diaphragm used in general secondary battery (including lead-acid battery, cadmium-nickel battery, zinc-silver battery, hydrogen-nickel battery), it is thinner, and the difference in the thickness will lead to remarkable difference in absorbing the deformation of the electrodes. The diaphragms in general secondary battery can absorb the deformation shift of electrodes in the direction perpendicular to its surface in certain extent, and amortize the stress appeared inside the battery. As to the lithium ion battery, the function of diaphragms to amortize the changes of electrode volume is very little, that means the changed electrode volume will pressure the diaphragms and change the distributing state of the electrolyte, leading the electrodes to expand as a whole, and extrude the shell to get a irreversible deformation, so it would be in instable state and lead to a hidden trouble of safety. The status is especially serious in large capacity dynamic battery. As using multiple separate battery corporately, the expansion of separate battery will affect the original physical dimension of the original battery groups seriously, and thus affect the safety property of the battery groups.

SUMMARY OF THE INVENTION

The object of the invention is to overcome the shortages and disadvantages of the above said prior art, and provide a lithium ion battery which can amortize the inner stress, avoid battery's expansion, and improve the safety property and cycle life of the battery.

The invention is realized by

A lithium ion battery, including positive and negative electrodes groups consisting of anode, cathode and diaphragm; electrolyte and shell, characterized in that polyolefine type material is provided among the positive and negative electrodes groups or between the electrodes groups and the inner wall of the shell, especially a porous elastomer of polyalkylene meta-fluoride and the elastomer is in the shape of sheet or stick with the thickness of about 0.5 mm-5.0 mm and the porosity of 10%-80%.

Comparing with the prior art, using the above technical proposal can get advantages and effects below:

a) Using the elastomer of non-metal material with the thickness of 0.5 mm-5.0 mm can amortize the stress inside the battery, absorb and release the shift brought by electrode expansion and shrink without affecting the electrochemistry system of the battery, so the battery is safe and credible.

b) The porous elastomer with the porosity of 10%-80% can storage certain amount of electrolyte, and can remarkably improve the cycles inside battery and multiplying discharge property of the battery.

c) It can be placed smartly, operated easily, and assembled easily, without affecting the manufacturing process layout of lithium lion battery.

BRIEF DESCRIPTION OF THE DRAWING

FIG. 1 is a schematic view of the structure of the lithium ion battery according to the invention.

DETAILED DESCRIPTION

A lithium ion battery, as shown in FIG. 1, includes positive and negative electrodes groups consisting of anode (positive material of the anode can be but not limited to one of $LiCoO_2$, $LiCo_xNi_{1-x}O_2$, $LiCo_xNi_yMn_{1-x-y}O_2$, $LiMn_2O_4$ or their mixtures, wherein $0<x<1$, $0<y<1$, and $1<x+y<1$) (1), cathode (positive material of the cathode can be but not limited to artificial graphite or refreshing composite natural graphite or their mixtures) (2) and diaphragm (3); electrolyte (it can be but not limited to 1 mol/L $LiPF_6$/EC+EMC+DEC) (4) and shell (5), and a porous elastomer (6) made of non-metal material is provided among the positive and negative electrodes groups, such as polyolefine, especially polyalkylene meta-fluoride plastic, and the elastomer is in the shape of sheet or stick or other shapes according to the structure of the electrodes with the thickness of 0.5 mm-5.0 mm and the porosity of 10%-80%; and the elastomer can also be provided between the electrodes groups and the inner wall of the shell, that can be applied in electrode groups made by superposing the convoluted electrode group or electrode sheet of the battery. The elastomer can amortize the stress inside the battery, absorb and release the shift brought by electrode expansion and shrink, avoid over-charging or over-discharging in some parts of the battery, and wherein the micropores provide extra space for electrolyte storage, so they can improve cycle life of the battery, avoid irreversible distortion of the battery, be safe and credible, and without affecting the chemistry (it is inertial to esters solvents of lithium ion battery electrolyte and organic lithium salts) and electrochemistry property of the battery.

EXAMPLE 1

As shown in FIG. 1, attempt to make 187286 (18 mm thickness, 72 mm width, 86 mm height) battery used in motor-assisted bicycle. Polyvinylidene fluoride latex with thickness of 1.0 cm and porosity of 45% is provided outside the electrode assembly, and the electrode assembly and the elastomer are bound together by adhesive tape and put into the shell, laser welded, then injected the solution, precharged, sealed off, formated (charge and discharge the battery to active the battery), aged and sorted by capacity (sorted by capacity of the battery) and so on to complete making the sample battery, marked as sample 1.

Under the ambient temperature of 25±3° C., use 1 hour rate current to prosecute the cycle of charge and discharge to test the battery, and the test program is as below:

1) stand for 10 min;
2) charge with 8.0 A steady current, time limit of 70 min, and voltage limit of 4.20V;
3) charge with steady current, voltage limit of 4.20V, time limit of 60 min, and cut-off current of 400 mA;
4) stand for 10 min;
5) discharge with 8.0 A steady current, time limit of 70 min, voltage limit of 3.00V.

Repeat step 1) to 5) for 500 times.

At the same time make the battery (control sample) without the above said elastomer by the same process, and prosecute the same cycle of charge and discharge as the above said test program to test the battery by 500 cycles. Correlative test data are in Table 1.

As can be seen clearly from Table 1, the capacity retention rate of the sample with the elastomer after 500 cycles is 75.4%, and the thickness of the battery is only 18.22 mm, that means respect to the original thickness of 18.0 mm, the thickness only changes 1.2%, while the capacity retention rate of the control sample after 500 cycles is 69.5%, the thickness of the battery increases to 19.98 mm, that means the thickness deformation rate of the battery is 11.0%, 9 times to sample 1.

TABLE 1

|  | Sample 1 | Control sample |
|---|---|---|
| Original capacity/Ah | 8.23 | 8.27 |
| Retained capacity after 500 cycles/Ah | 6.21 | 5.75 |
| Deformation rate of thickness/mm | 0.22 | 1.98 |

EXAMPLE 2

As shown in FIG. 1, attempt to make 187286 (18 mm thickness, 72 mm width, 86 mm height) battery used in motor-assisted bicycle. Polyvinylidene fluoride latex with thickness of 1.0 cm and porosity of 55% is provided outside the electrode assembly, and the electrode assembly and the elastomer are bound together by adhesive tape and put into the shell, laser welded, then injected the solution, precharged, sealed off, formated (charge and discharge the battery to active the battery), aged and sorted by capacity (sorted by capacity of the battery) and so on to complete making the sample battery, marked as sample 2. Test ambient and test program are the same as example 1.

At the same time make the battery (control sample) without the above said elastomer according to the same process, and prosecute the same cycle of charge and discharge as example 1, test the battery by 500 cycles. Correlative test data are in Table 2.

As can be seen clearly from Table 2, the capacity retention rate of the sample with the elastomer after 500 cycles is 75.1%, and the thickness of the battery is only 18.24 mm, that means respect to the original thickness of 18.0 mm, the thickness only changes 1.3%, while the capacity retention rate of the control sample after 500 cycles is 69.9%, the thickness of the battery increases to 19.92 mm, that means the thickness deformation rate of the battery is 10.7%, 8 times to sample 2.

TABLE 2

|  | Sample 2 | Control sample |
|---|---|---|
| Original capacity/Ah | 8.35 | 8.41 |
| Retained capacity after 500 cycles/Ah | 6.27 | 5.88 |
| Deformation rate of thickness/mm | 0.24 | 1.92 |

The invention claimed is:

1. A lithium ion battery, comprising:
a shell for serving as a casing of said lithium ion battery;
an electrolyte, situated within said shell;
a plurality of electrode sets, surrounded by said electrolyte, having an anode, a cathode, and a diaphragm, positioned between said anode and said cathode, for serving as a separator of said anode and said cathode; and
a non-metal porous elastomer that is sandwiched between two electrode sets of said plurality of electrode sets and is disposed between said plurality of electrode sets and the inside wall of said shell; wherein said non-metal porous elastomer is a polyolefine having a thickness of 0.5 mm-5.0 mm and a porosity of 10%-80%.

2. The lithium ion battery of claim 1, wherein said polyolefine is a polyalkylene meta-fluoride.

3. The lithium ion battery of claim 2, wherein said polyalkylene meta-fluoride is a polyvinylidene fluoride.

4. The lithium ion battery of claim 1, wherein said polyolefine is a polyethylene.

* * * * *